Aug. 8, 1944.   G. H. FRITZINGER   2,355,288
NONSPILL VENT MEANS
Filed April 24, 1942
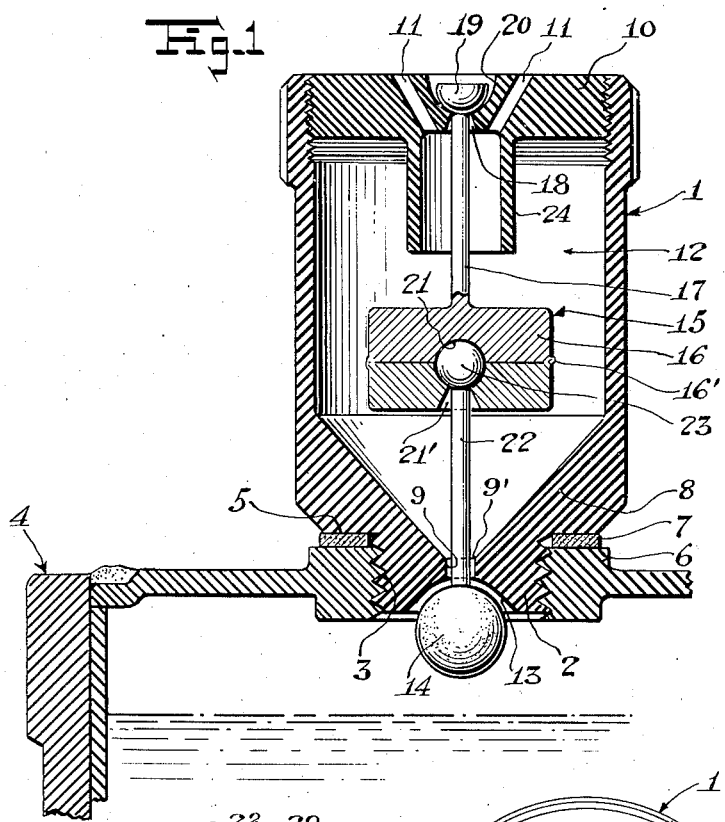
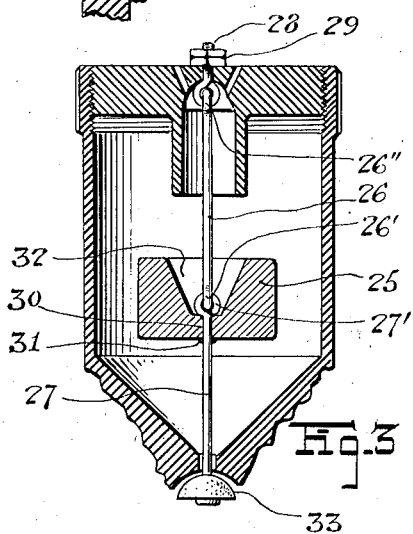
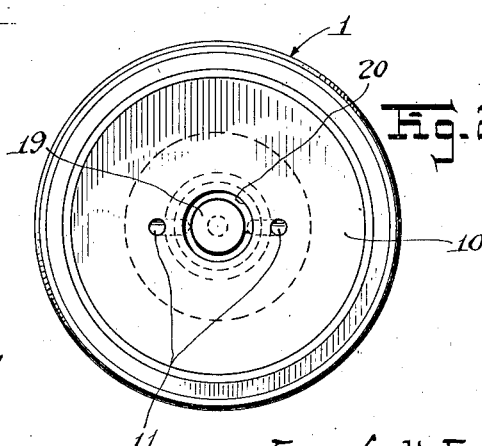
Inventor
George H. Fritzinger
By Henry Lanahan
Attorney Patented Aug. 8, 1944

2,355,288

UNITED STATES PATENT OFFICE 2,355,288

NONSPILL VENT MEANS

George H. Fritzinger, West Orange, N. J., assignor to Thomas A. Edison, Incorporated, West Orange, N. J., a corporation of New Jersey Application April 24, 1942, Serial No. 440,344

6 Claims. (Cl. 137—139)

This invention relates to non-spill vent means for liquid-containing receptacles, and more particularly to non-spill vent plugs for storage batteries.

Storage battery cells are required to be vented to permit the escape of the gases evolved by the cells. In those applications however where the batteries are liable to be tilted or inverted during service, such as is the case with batteries used on airplanes, it is necessary to provide means to close the vents when the batteries are tilted beyond a predetermined angle so as to prevent leakage of the electrolyte from the cells.

It is an object of my invention to provide an improved non-spill vent arrangement which is simple and economical in construction and positive and dependable in operation.

It is another object to provide a simple valve-actuating mechanism for non-spill vent devices.

It is another object to provide a simple valve-actuating mechanism, for a non-spill vent plug, which is capable of exerting a strong actuating pressure on the valve both to close the valve when the mechanism is tilted and to open the valve when the mechanism is righted. To so obtain a strong actuating pressure on the valve, my invention contemplates the use of a simple toggle arrangement as is hereinafter fully described.

A yet further object of my invention is to provide a non-spill vent arrangement which is readily adjustable to control the angle at which the valve will close, and to compensate for variances in assembling and for disformation of parts during service.

Other and allied objects of my invention will more fully appear from the following description and the appended claims.

In the description of my invention reference is had to the accompanying drawing, of which:

Figure 1 is a vertical sectional view to enlarged scale of a vent plug arrangement according to one embodiment of my invention;

Figure 2 is a top plan view of the vent plug of Figure 1; and

Figure 3 is a vertical sectional view to reduced scale of an alternative arrangement of my invention.

The vent plug shown in the accompanying figures includes a cylindrical shell or casing 1 provided with an extension 2 at the bottom which is adapted to be threaded into the filler opening 3 of a storage battery cell 4. Between the shoulder 5 at the bottom of the casing and a flange 6 surrounding the filler opening there may be interposed a gasket 7 for insuring a tight seal of the casing to the battery cover. This casing has a bottom wall 8 provided with an axial vent opening 9, and has a top wall or cap 10 threaded into the upper end portion thereof, which is provided with central vent openings 11, the plug being thus formed with a chamber 12 which is vented at the top and bottom.

In the bottom wall 8 below the vent opening 9 there is provided a valve seat 13, and supported below this valve seat for cooperation therewith is a valve 14. This valve is carried by a toggle arrangement 15 which is suspended from the cap 10 and weighted at its center joint by a lead weight 16. The upper element of this toggle arrangement may be a cord or preferably a metal rigid rod 17 joined integrally to the weight as is shown in Figure 1. This rod may extend loosely through an axial opening 18 in the cap 10 and may terminate into a semisphere 19 at the top, which may be fused to or cast onto the end of the rod after the rod is passed through the opening. This semisphere may seat into a concavity 20, provided in the top surface of the cap, to form a ball and socket, or universal, joint of the weight to the cap. The length of the rod 17 is preferably such as to support the weight at a level substantially midway the height of the chamber 12.

In the embodiment shown in Figure 1 the weight may comprise two half sections applied face to face and fused together as at 16'. These sections then have registering cavities forming a spherical socket 21 at the center of the weight, and the lower section has an opening 21' running down from this socket. Universally pivoted to the weight is a rigid depending metal stem or rod 22 having a ball 23 fitting the socket 21. This rod extends loosely through the lower vent opening and has the valve 14 aforementioned mounted on the lower end portion thereof.

The valve 14 and the cooperating valve seat 13 may each be spherical in shape, as is shown, but are to have different diameters so that the valve may engage the seat over a limited annular surface to form a tight closure of the vent opening. For the same purpose, either the valve or valve seat should be made of semiresilient rubber.

It will be seen that when the battery cell is in upright position the toggle arrangement will depend in a straight line from the cap 10 and assume a substantially true axial position in relation to the plug. In this position of the cell, the valve is supported in open position at a small distance below the valve seat, this distance being readily set at any desired value in the present arrangement merely by threading the cap 10 inwardly or outwardly of the casing. When the battery cell is tilted, however, the weight 16 will swing to the side, by reason of the force of gravity tending to maintain it always in a wholly depending position, and will thus move the valve into engagement with the valve seat to close the lower vent opening. Leakage of the electrolyte through the plug is thus prevented while the cell is tilted beyond a predetermined angle. When the cell is righted, the weight will return by gravity to its axial position, and will act through the rigid valve stem 22 to force the valve from the valve seat and restore the venting through the plug.

As a typical set of values, the length of the toggle arrangement 15—and thus also approximately the height of the vent plug—may be two inches, and the weight may be supported at a point midway the length of this toggle arrangement as is aforementioned, the rod element 17 being thus approximately one inch long. Also, the valve stroke, or maximum spacing of the valve from the valve seat, may be .020 inch. For these typical values, the critical tilt angle of the plug, or angle of displacement of the weight 16 from the vertical axis of the plug about the ball pivot 19 as a center, at which the valve 14 will be closed is approximately 8°. While it is not necessary to have the valve closed when the battery cell is tilted by only such a small angle, this critical tilt angle is to be made as small as is practical because then a greater force will be exerted upon the valve to hold it closed as the cell is tilted beyond this angle. For instance, it can be readily shown that the force by which the valve is pressed against the valve seat, when the battery cell is tilted beyond the critical tilt angle to an angle theta with respect to the vertical, is $$\frac{W}{2}\left(\frac{\sin\theta}{\tan\alpha} - \cos\theta\right)$$

where alpha is the critical tilt angle above referred to and W is the force of gravity acting on the weight. It is seen from this equation that when the cell is tilted 20° the force exerted on the valve to close it is already .75 as great as the force of gravity on the weight; and that when the cell is tilted 90° the valve closing force reaches a maximum value approximately 3.5 times as great as that of the weight. Of course, when the cell is wholly inverted the force on the valve will be just that of the weight.

When the cell is tilted, the valve stem 22 rests on the shoulder 9' at the inner end of the vent opening 9 and holds the valve 14 at the axis of the plug. This insures a continuous even contact of the valve against the valve seat, and thus a positive closing of the vent opening 9.

In the embodiment above described the ball 23 is to fit the socket 21 loosely, to be free from friction, but should be limited in vertical play to a value substantially less than the distance of the valve stroke. For this condition it can be readily shown that if the valve is held closed as the cell is righted, the weight will exert a force on the valve to open it which is one-half that of the weight. This substantial force of the weight on the valve, acting through the rigid stem 22, insures that the valve will be opened each time the cell is righted.

Depending from around the vent openings 11 in the cap 10 is a tubular wall 24. This wall serves as a trap to prevent escape from the plug while the cell is inverted of whatever small amounts of electrolyte may leak into or have become condensed in the chamber 12.

It will be noted that the weight may be rigidly secured to either one of the rods or links of the toggle arrangement; however, for producing a maximum valve-closing force, the weight is to be supported with its center of gravity substantially at the center joint of the toggle. In the embodiment shown in Figure 3, for example, a weight 25 is secured rigidly to the lower link of the toggle instead of to the upper link as in the former embodiment. Here the toggle is shown as comprising a pair of upper and lower links 26 and 27 joined simply by a pair of interengaging loops 26' and 27' provided at the ends of the links. The upper link is attached to the cap of the plug in similar manner by means of an eyebolt 28, held to the cap by nuts 29, and by a loop 26'' on the upper end of the link which is hooked to the eyebolt. The weight 25, which is now in one piece, has a central bore 30 through which the lower link 27 is pressed and is held rigidly to the link as by solder 31. An upper circular cavity 32 in the weight serves to permit free universal pivoting of the link 26. However, because of the provision of this concavity the weight is extended upwardly so as to maintain its center of gravity substantially at the universal joint between the links of the toggle. The valve, which is here shown in the form of a semisphere 33, is secured to the lower link 27 in any suitable manner.

It will be seen that this second embodiment represents a very simple arrangement of my invention wherein friction at the joints of the toggle is reduced to a minimum. Moreover, it will be noted that looseness in the center joint—which is desirable in tending further to reduce friction—is not now critical with respect to the opening of the valve when the cell is righted since the weight is secured directly to the lower link or valve stem.

The particular embodiments of my invention herein shown and described are intended to be illustrative and not limitative of my invention, as many changes and modifications may be made therein without departing from the true scope of my invention which I endeavor to express according to the following claims.

I claim:

1. A non-spill vent plug for the filler opening of a storage battery comprising walls forming a chamber having upper and lower vent openings; toggle means suspended within said chamber and comprising a rigid member extending loosely through said lower vent opening, a valve mounted on said rigid member below said lower vent opening, and a weight rigidly secured to said rigid member in position wherein the center of gravity thereof is substantially at the joint of said toggle means, said weight serving to hold said toggle means in a straight-line arrangement wherein said valve is displaced below said lower vent opening while said battery is in upright position, and to move the toggle means out of said straight-line arrangement to lift said valve into vent closing position as the battery is tilted.

2. Non-spill vent means for a storage battery, comprising a wall provided with a vent opening, a valve below said vent opening; a toggle suspension carrying said valve and provided with a single universal joint at the center thereof; and a weight carried by said suspension in position wherein the center of gravity of the weight is substantially at said universal joint.

3. Non-spill vent means for a storage battery comprising a wall provided with a vent opening, a toggle linkage suspended above said vent opening and having the lower link extending down through said vent opening, a valve secured to the lower link of said linkage below said vent opening, and a weight secured rigidly to one of the links of said linkage, said weight being positioned and arranged so that its center of gravity is substantially at the joint of said linkage.

4. A non-spill vent plug for a storage battery comprising a cylindrical structure providing a chamber having vents in the top and bottom thereof, a tube surrounding the upper one of said vents and depending within said chamber, a suspension connected to the top wall of said chamber and extending down through said tube, a weight carried by said suspension below said tube; and a valve below said lower vent having a rigid stem extending upwardly through said lower vent and connected to said weight.

5. A non-spill vent device for a liquid-containing receptacle comprising a vented structure having upper and lower walls and provided with a vent opening in the lower wall thereof; a toggle arrangement suspended from said upper wall and including a lower rigid link extending down through said vent opening; a valve member rigidly connected to the lower portion of said lower link in a position below said vent opening; and a weight carried by said toggle arrangement at the joint thereof for lifting said valve member to close said vent opening upon tilting said vent device from a normal vertical position, said weight being rigidly connected to said lower link to press down on said valve member and restore the same to open position upon returning said vent device from a tilted position to said normal vertical position.

6. A non-spill vent device for a liquid-containing receptacle comprising a vented structure including upper and lower walls and having a vent opening in the lower wall thereof; a toggle linkage suspended from said upper wall and including a lower rigid link extending down through said vent opening; a valve member carried by said linkage below said vent opening; a weight carried by said linkage at the joint thereof, said weight operating to lift said valve to a vent-closing position when said device is tilted from a normal vertical position; and means to adjust said toggle linkage vertically relative to said lower wall whereby to set the distance of said valve member from said vent opening when the vent device is in a normal vertical position and to establish the angle of tilt of said device at which said vent opening will be closed by said valve member.

GEORGE H. FRITZINGER.